J. M. COURTENAY, Dec'd.
MARGARET J. COURTENAY, executrix.
ORE CRUSHER.

No. 253,009. Patented Jan. 31, 1882.

WITNESSES:
C. Neveux
E. Sedgwick

INVENTOR:
J. M. Courtenay
BY Munn & Co
ATTORNEYS.

UNITED STATES PATENT OFFICE.

JOHN M. COURTENAY, (DECEASED,) OF CORNWALL-ON-THE-HUDSON, NEW YORK; MARGARET J. COURTENAY, EXECUTRIX.

ORE-CRUSHER.

SPECIFICATION forming part of Letters Patent No. 253,009, dated January 31, 1882.

Application filed February 13, 1880.

*To all whom it may concern:*

Be it known that I, JOHN M. COURTENAY, of Cornwall-on-the-Hudson, in the county of Orange and State of New York, have invented a new and useful Improvement in Ore-Crushers, of which the following is a specification.

Figure 1:
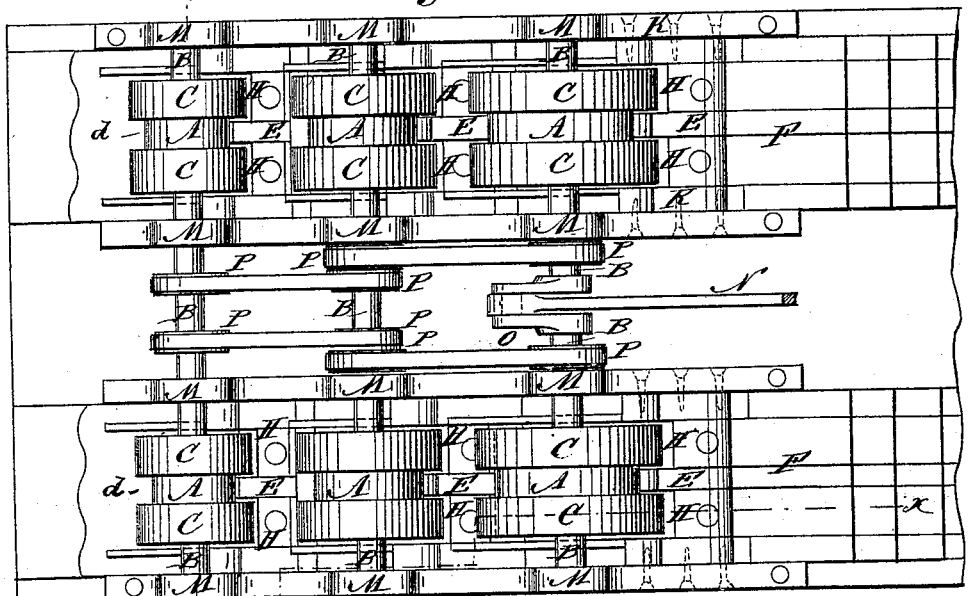
Figure 2:
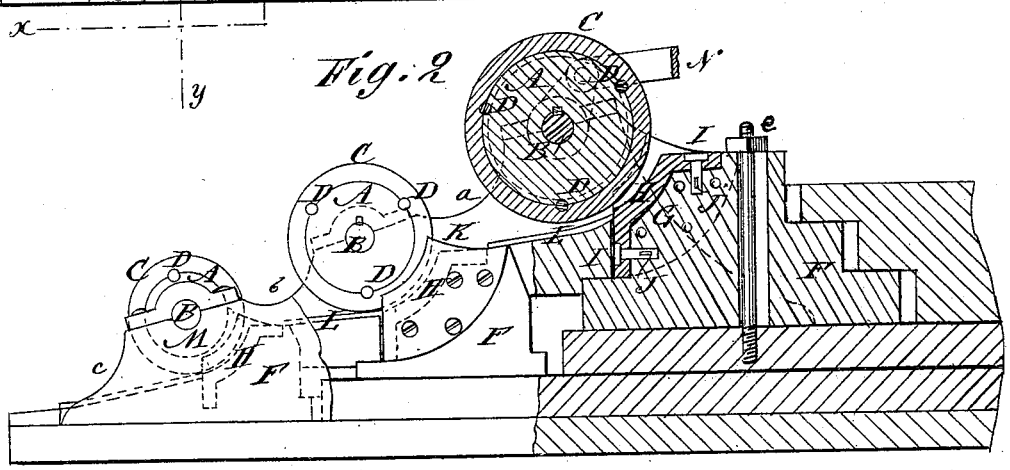
Figure 3:
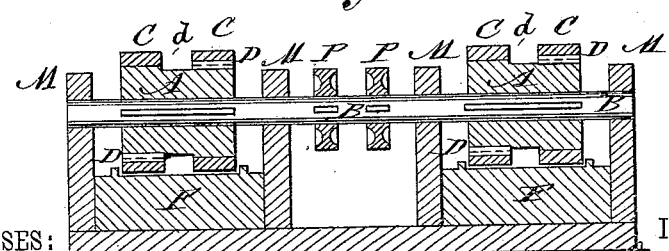

Figure 1 is a plan view of the improvement. Fig. 2 is a side elevation, partly in section, through the broken line $x\ x$, Fig. 1. Fig. 3 is a sectional end elevation taken through the line $y\ y$, Fig. 1.

Similar letters of reference indicate corresponding parts.

The object of this invention is to crush ores in a more thorough and inexpensive manner than with the ordinary stamps.

The invention consists in a novel construction and arrangement of parts, as hereinafter fully described.

A represents the crushing-wheels, which are made of cast-iron, are large and heavy, and are mounted upon shafts B. The wheels A are provided with heavy steel tires C, two to each wheel A, which tires C are secured in place by keys D. The annular space $d$ between the tires C receives a flange plate or web, E, formed upon the abutment F. The abutment F is made of cast-iron, is large and heavy, and is secured to some suitable support by bolts $e$, secured in the said support, and passed through slots in the abutment, and provided at their ends with nuts; or any other suitable means may be employed, so that it can be moved closer to or farther from the wheel A C, as may be required.

Upon the forward part of the abutment F, directly opposite the tires of the wheel A, and upon the opposite sides of the plate or web E, are formed seats G, to receive the steel dies H. The middle parts of the dies H are curved upon the arc of a circle of about the diameter of the outer surface of the tires C. The end parts of the dies H are straight, and about at right angles with each other. The seats G are so formed that the space between the concave face of the die H and the convex face of the tire C may taper gradually from its upper to its lower end, as shown in Fig. 2. The dies H are held to their seats G by headed pins I, passing through the end parts of the said dies and into holes in the seat G, where they are secured in place by keys J, as shown in Fig. 2. The heads of the pins I are countersunk into the end parts of the die H.

To the sides of the die-seats G are bolted side plates, K, which project in front of the dies H and overlap the outer sides of the tires C. The web E and side plates, K, thus form channels in which the tires C work, so that any ore that may be introduced into the tapering space between the tires C and dies H will be crushed and ground to such a size as to pass out at the lower end of the said space. As the crushed ore escapes it is received upon an apron or trough, L, and passes to the next wheel, when more than one are used. In each succeeding wheel of a set the wheels A C and dies H are set closer together, so as to reduce the ore to the desired fineness. From the last apron L the ore is conducted to the washing and separating apparatus. The wheels A of a set are placed at different levels, $a\ b\ c$, each succeeding wheel being at a lower level than the preceding one, so that the ores may pass from one wheel to another without rehandling. The shafts B revolve in bearings in suitable supports, M, and motion is given to the shaft B from an engine by a pitman, N, and crank O. Motion is given to the succeeding shafts B, when used, from the first shaft by pulleys P and belts.

With this construction, as the ore is introduced into the space between the wheels A C and the die H, it is first crushed or broken by the action of the wheel, and is then ground into smaller pieces as it is carried forward through the said space, the wheels A C and abutments F being made so heavy that there will be no appreciable jar in any part of the machine, and no appreciable check of motion in the wheels A C.

With this construction, when the tires C wear, the abutments F can be moved forward to take up the wear by loosening the nuts, adjusting the abutments in place, and then tightening the nuts again, and when the tires C are worn out they can be replaced with new tires.

With this construction, also, when the lower part of the die H wears it may be reversed to bring the wear upon the other part, and when worn out it can be readily replaced with a new one.

Having thus described my invention, I claim as new and desire to secure by Letters Patent—

1. In an ore-crusher, the crushing-rollers A, provided with the detachable tires C and the central annular space, d, between the said tires, substantially as and for the purpose set forth.

2. In an ore-crusher, the combination, with the crushing-rollers A, provided with the steel tires C, and the annular space d between the said tires, of the adjustable abutment F, provided with the central web, E, and the removable dies H, substantially as and for the purpose set forth.

3. In an ore-crusher, the combination, with crushing-rollers A, provided with annular space d, of the adjustable abutment F, provided with the web E, the side plates, K, and the removable dies H, substantially as and for the purpose set forth.

4. In an ore-crusher, the combination, with the crushing-wheels and the abutments, of the dies H, formed curved at the middle and straight at the ends, and provided with means for detachably securing said dies to the abutments, substantially as described, whereby the dies, when worn, may be reversed, as set forth.

JOHN M. COURTENAY.

Witnesses:
JAMES T. GRAHAM,
C. SEDGWICK.